Feb. 25, 1958   R. T. REMINGTON   2,824,464
HINGED PEDAL STRUCTURE
Filed Jan. 13, 1954

INVENTOR.
Ralph T. Remington
BY
Wilson, Redrow, and Gaines
Attorneys

United States Patent Office 2,824,464
Patented Feb. 25, 1958

2,824,464
HINGED PEDAL STRUCTURE

Ralph T. Remington, Roseville, Mich., assignor to Studebaker-Packard Corporation, a corporation of Michigan Application January 13, 1954, Serial No. 403,753

9 Claims. (Cl. 74—513)

The present invention relates to hinged pedal structure, particularly automobile accelerator pedal structure having a hinge-pin type joint at the heel end thereof in which the joint parts themselves inherently afford a self-retaining action to the body of the hinge pin.

An object of the invention is the provision of a hinged accelerator pedal construction of which the hinge pin is inserted in a hinge-core of elastic material, and the core and the pin have self-engageable complementary parts which yieldably engage upon insertion of the pin to hold it stationarily against relative axial displacement. According to a feature of the construction just set forth an inwardly directed radial protrusion or bead of rubber is integrally incorporated in the interior of the hinge core and disengageably engages one or both of the sides of a circumferential recess on the pin for yieldably holding the pin against axial displacement from the core of the hinge.

Another object of the invention is the provision of a rod actuating, pivotally mounted accelerator pedal, wherein an elastic core at one end of the pedal forms a quiet joint or connection to the actuated rod and wherein an elastic core at the opposite end of the pedal forms a quiet self-lubricated joint or connection to the mounting pivot for the pedal. According to a feature of the invention the latter joint forms a pin type hinge and includes an elastic upraised rubber part which yieldably engages the hinge pin to secure the same in place.

Another object is to provide, in an accelerator pedal mechanism having an apertured pair of spaced apart bracket means in which one of the apertures affords a blind opening, a pin type hinge structure for supporting the heel end of the accelerator pedal wherein the hinge core is arranged to present a deflectable lip disposed adjacent the blind opening and, upon insertion of the hinge pin in the core, the lip is deflectably engageable with companion means on the hinge pin for self-retainably restraining it once it enters the blind opening.

A further object of the invention is the provision of a quiet pin type hinge for the bracket supported heel end of a pedal structure, in which the pin and the support bracket for the pedal present complementary interengaged parts preventing unwanted relative motion of the pin in a direction about its axis and the pin and its quiet acting hinge core have complementary inter-engaging parts preventing unwanted axial displacement of the pin.

Further features, objects and advantages will either be specifically pointed out or become apparent when for a better understanding of the invention reference is made to the following written description taken in conjunction with the accompanying drawings in which Figure 1 is a side view of the present pedal invention in the environment of an automobile floor pan;

Figure 1:
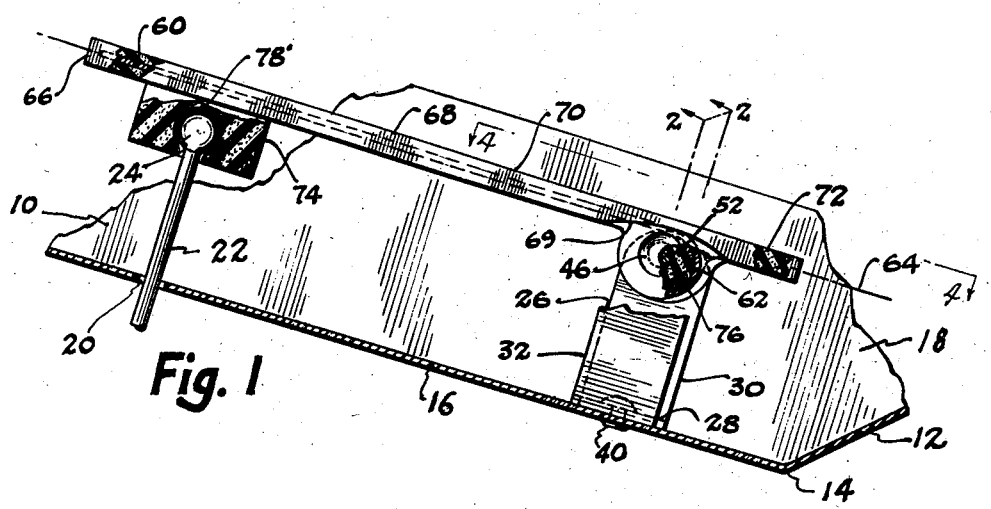
Figures 2, 4:
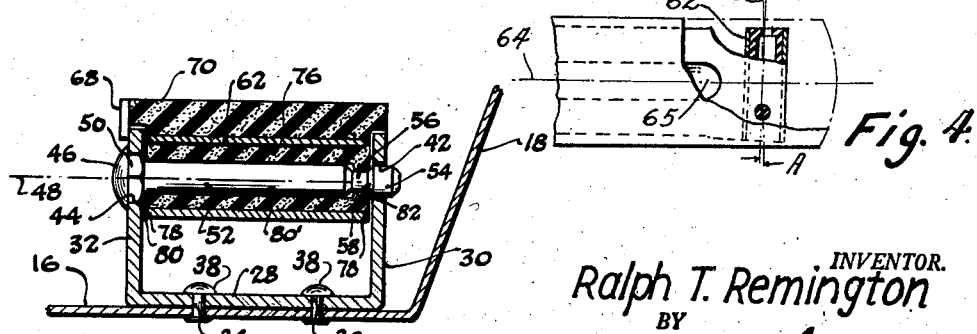
Figure 2 is a section through the hinge joint of the pedal taken along the angled lines 2—2 of Figure 1.
Figure 4 is a view corresponding to the section line 4—4 of Figure 1 with portions of the pedal broken away and bent back in the area of the hinge.

In Figures 1 and 2 of the drawing, a floor pan structure 10 for motor vehicles especially passenger automobiles, is shown to include a generally horizontally disposed floor pan 12 which is bent along a juncture line 14 at its forward end to form a diagonally related integral toe board 16. Toward the longitudinal midportion thereof, the floor pan 12 is upwardly embossed to provide a tunnel structure 18 suitable for accommodating a transmission, clutch assembly, mechanical flywheel or fluid flywheel for the engine of the vehicle as appropriate. The toe board 16 is provided with a rod receiving opening 20 which is formed at a relatively remote location to the juncture line 14 and receives therethrough a reciprocating accelerator rod 22. The rod 22 is pedal actuated so as to move substantially longitudinally along a line which is spaced apart from the swing axis of the actuating pedal and for this purpose has an enlarged spherically formed actuating head 24 at one end thereof. At the opposite end the rod 22 is adapted to be connected through suitable linkage to a speed controlling device for the vehicle engine, not shown, such as a carburetor or injector pump or other component of an injection system.

A pedal support bracket 26 of general U-shape has a base portion 28 which is upwardly bent at its opposite ends to provide a pair of spaced apart vertically upstanding legs one of which at 30 is near the transmission tunnel 18 and the other of which at 32 is relatively remote to the tunnel 18. The base portion 28 of the bracket 26 and the adjacent portion of the floor pan 16 are formed with sets of registering apertures which are transversely spaced apart from one another and indicated at 34, 36 respectively. The bracket 26 and the floor pan 16 are secured together by means of welding or fasteners such as a set of rivets 34, 36 received respectively in the registering apertures 34, 36 just noted. The near leg 30 is formed with a circular pin receiving opening 42 which is in axial alignment with respect to a relatively larger opening 44 of square section formed in the far leg 32. The two aligned openings 42, 44 receive and support a headed pivot pin 46 defining a pedal swing axis 48 which is substantially horizontally disposed at a level above the horizontal floor pan 12.

Tang or snug means may be provided on the pin 46 adjacent the head thereof to prevent relative rotation of the pin 46 about its axis 48.

Illustrative of one commonly formed expedient to provide such tang means is a four-sided square pin section 50 incorporated on the pin 46 immediately below the head thereof and integral with the pin shank indicated at 52. The square shaped section 50 of the pin is complementally received in the square opening 44 and together their noncircular cross sections interengage to prevent any relative rotation of the pin 46 after assuming its final position of assembly. At the opposite end the pin 46 has a portion 54 of round section which is beveled at the extremity thereof and which is fairly snugly received in the complemental aperture 42. At an intermediate portion adjacent the round section 54 the pin is relieved to form an annular groove or recess 56 having a section of comparatively reduced diameter adjacent the larger section 54 so as to form a beveled shoulder 58. The groove 56 defines an opposite beveled shoulder in cooperation with the main portion 52 or shank of the pin.

An accelerator pedal plate 60 preferably formed of a steel stamping is provided to complete the present accelerator pedal mechanism and is arcuately bent back on itself at the heel portion thereof to form a substantially closed loop 62 having an axis 61 contained in a plane transverse with respect to the plate 60 which plane coincides with the plane of the section 2—2 of Figure 1 and which defines a slight acute angle to a reference line 63, Figure 4, that is disposed in the plane of the plate 60 so as to be mutually perpendicular with respect to the central longitudinal axis indicated at 64 for the pedal plate 60. In one physically constructed embodiment of the invention, the slight acute angle just noted was 2° as indicated at A. Generally along such longitudinal central axis 64 the pedal plate 60 may be embossed to provide a depressed stiffening rib 65 and at the opposite long sides thereof the pedal plate 60 may be downturned so as to form slightly pronounced stiffening flanges which further contribute to longitudinal rigidity. The plate 60 has a covering of nonmetallic material 66 which extends over a considerable portion if not all of the surface of the plate 60. The right and left side edges of the covering 66, the latter being indicated at 68 in Figures 1 and 2, are relatively relieved as at 69 along an arcuate path so as to accommodate the upper ends of the bracket legs 30, 32 at the opposite sides of the pedal plate.

The top surface of the covering 66 indicated at 70 may be scored or otherwise roughened and provided with indicia or suitable characters, not shown. An overhanging extension 72 of the covering 66 extends slightly beyond and to the rear of the heel portion of the accelerator pedal plate 60. The covering 66 is formed of a generally elastic material of the character of rubber, elastic plastic, synthetic resins, or other suitable elastomer and integrally incorporates a pair of generally cylindrical appendages or parts at the toe and heel portions at 74 and 76 respectively. The cylindrical part 74 is socketed to form an elastic rod receiving core 78' the axis of which extends generally perpendicular to the plane of the plate 60. The cylindrical part 76 contains an axial bore disposed generally parallel to and below the plane of the plate 60 and forming an elastic pin receiving core 80'.

In one physically constructed embodiment of the invention the material for the main body of the covering 66 was S. A. E. R–610–JK rubber and the integral cylindrical part 74 was S. A. E. R–615–K rubber having a socket whose spherical angle measured in terms of the elastic core 78' was between 180 and 360 spherical degrees and actually amounted to 312°. The cylindrical part 76 was S. A. E. R–810–K wax impregnated rubber providing a quiet self-lubricated pin joint and being formed with integral lateral protrusions at 80 adapted radially to overhang and cover the adjacent ends 78 of the loop 62 so as to prevent any metal-to-metal contact as between the loop and the bracket 26 which, together therewith, was formed of a steel stamping, U. S. Std. gauge No. 16.

At the end of the elastic core means 80 adjacent the smaller support opening 42 in the bracket leg 30, the cylindrical part 76 is provided with an inwardly protruding radial lip or rib 82 which deflects upon insertion of the pin 46 to its final position and re-engages the latter within the grooved section 56 so as to abut the shoulder 58 at the side of the groove. The resulting yieldable engagement prevents unwanted axial displacement of the pin 46 after its insertion to final position along the axis 48.

Figure 3:
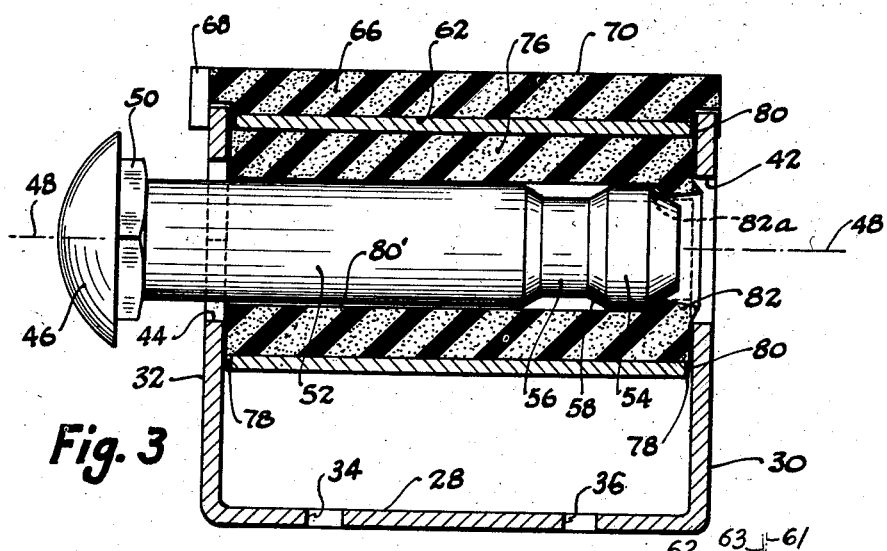
Figure 3 is an enlarged view based on Figure 2 and showing the relationship of the hinge parts at an intermediate stage in the assembly thereof.

In Figure 3 an in-process representation of the assembly of the pin and the pedal appears. In the intermediate position of assembly of the pin 46 shown in solid lines in Figure 3, the beveled terminal extremity of the end section 54 of the pin engages the inwardly protruding annularly continuous rib 82 of the rubber core 76 and on further movement deflects it to a partially deformed position shown in solid lines in Figure 3. Additional penetration of the pin 46 within the elastic core interior 80' causes the rubber lip 82 to be deflected farther and out of the direct path of the pin 46 such that the round section 54 may come to rest on the margins of the complemental bracket opening 42 and occupy its final position. Thereupon the deflectable rubber lip 82 snaps into a final dotted line shoulder engaging position shown by the dotted lines 82a in Figure 3 and thereafter deflectably prevents withdrawal movement of the pin 46 along the axis 48. Owing to the nearness between the opening 42 and the tunnel 18, the opening 42 is rendered virtually a blind opening and for this reason the automatic re-engagement between the grooved end of the pin and the lip on the core means at the corresponding end of the latter greatly facilitates the self-retention action of the pin which in the case of conventional retainer means of different types would be rendered rather complicated owing to the virtual inaccessibility of the inner end of the blind opening 42 adjacent the tunnel 18.

In operation, the pedal plate 60 is adapted to swing pivotally about the axis 48 so as to move in a substantially vertical plane normal to the axis 48, the rod 22 simultaneously moving longitudinally or lengthwise generally in the same vertical plane but along a path which is spaced apart with respect to the axis 48. The elastic core means 78' accommodates not only tilting action of the accelerator rod 22 relative to the plane of the plate 60 but also in extreme positions of the accelerator pedal accommodates a slight twisting or transverse wiping action of the head 24 of the rod therein due to the relative skew angularity as between the respective axes 48, 64 and the axis of the accelerator rod 22. The elastic core means 78' and 80' form quietly acting joints with the respective metal parts 24 and 52 with which they are associated and in each case the mouth of the socket openings at 78' and the mouth 82 of the cored bore 80' deflect during assembly of the associated parts to receive the ends of the parts 22 and 46. In the case of the wax impregnated material 76 which is homogeneous throughout, a self-lubricated action occurs which contributes further to quietness in the joint. Relative rotation occurs between the surfaces of the stationary pin shank 52 and the relatively rotatable core surface 80' which moves concurrently with the pedal plate 60. Similarly, relative rotation occurs between the margin of the lip 82 and the bottom and the shoulders of the groove 56.

As herein disclosed the hinge pin at the base or heel of the accelerator pedal is shown to have an interfitted noncircular section at the head end of the pin to prevent relative rotative movement thereof and the hinge pin is further shown to have a shoulder formed between adjacent portions of different diameter at its opposite end and engageable by a deflectable rubber lip to prevent axial displacement of the pin. It is evident that the noncircular section and the shoulder may be located if desired at the same end or at a common intermediate portion of the pin or in the alternative, the shoulder and its engageable lip be located at the head end of the pin whereas the noncircular section of the pin and its interfitted companion part may be disposed at an opposite end with respect thereto. So also the drawing shows a cylindrical part of rubber which forms a quiet joint at each end of the rubber covered pedal and each of which is different from the other cylindrical part to the extent that one is self-lubricated due to wax impregnation and the other part is not so lubricated, but self-evidently the latter said part may be wax impregnated so as to be self-lubricated and conceivably both cylindrical parts may be lubricated or not depending upon the operational characteristics desired. The hinge pin is seen to be of the same outside diameter at the opposite sides of the annular retaining groove or recess shown disposed at one end thereof and the inner lip at the corresponding end of the core means is seen to be of a relatively smaller inside diameter in comparison, but indeed it is not essential to the invention that the recess and the lip be so related exactly at the end of the core means and the engagement between the lip and the adjacent shoulder of the annular recess on the pin can be rendered equally effective if the outside diameter of the extreme end of the pin is proportioned so as to be smaller than the outside diameter at the opposite side of the recess but nevertheless proportioned so as to be larger than the outside diameter of the recess and larger than the inside diameter of the lip.

Variations within the spirit and scope of the invention described are equally comprehended by the foregoing description.

What is claimed is:

1. Bearing and support means for swingably mounting a two ended member having a fixed substantially horizontal axis of swing and having pin receiving structure at one end through which the swing axis is adapted to pass, said bearing and support means comprising core means of deformable material included within the structure at one end of the member, a headed pin therein concentric to said axis and insertable therethrough to a final position whereby each end extends beyond the corresponding end of the core means, spaced apart apertured bracket means providing stationary support at the opposite ends of the pin, said pin and said bracket means having means establishing cooperation therebetween at the head end of the former to hold the same fixed to the latter against relative movement in a direction about said axis, said pin and said core means having means at the opposite end of the former rendering the same disengageably fixed to the latter against movement in an axial direction and comprising an inwardly directed protrusion of the core means which is laterally deflectable out of its normal shape by means of the just said opposite end of the pin upon initial insertion of the pin therethrough to a predetermined position, and comprising a portion of the pin formed with a reduced diameter occupied by the protrusion when the elastic restores itself to normal shape and forming a shoulder yieldably engaged thereafter by means of the protrusion of the core means to hold the pin axially fixed in its above described final position.

2. Bearing and support means for swingably mounting a pedal member having a fixed substantially horizontal axis of swing and having pin receiving structure at one end through which the swing axis is adapted to pass, said bearing and support means comprising core means of deformable material adapted to be bonded within said structure at one end of the pedal member, a pin therein concentric to said axis and insertable therethrough to a final position whereby each end extends beyond the corresponding end of the core means, spaced apart apertured bracket means providing support at the opposite ends of the pin, said pin and said bracket means having means establishing cooperation therebetween at one end of the former to hold the same fixed to the latter against relative movement in a direction about said axis, said pin and said core means having means establishing cooperation at the opposite end of the former rendering the same fixed to the latter against relative movement in an axial direction and comprising an inwardly directed elastic protrusion of the core means which is laterally deflectable out of its normal position by means of the just said opposite end of the pin upon insertion of the pin therethrough to a predetermined initial position, and a portion formed on the pin with reduced diameter adapted to be occupied by the protrusion when it elastically restores itself to normal position and forming a shoulder yieldably engaged by the protrusion of the core means to hold the pin fixed in its above described final position.

3. In combination, a two ended accelerator pedal member having a fixed substantially horizontal axis of swing and having pin receiving structure at one end through which the swing axis passes, accelerator rod receiving structure at the opposite end and having a ball-receiving socketed body incorporating elastic core means at the interior of the socket, bearing and support means comprising self-lubricated core means adapted to be bonded within said structure at said one end of the member and having the body thereof impregnated throughout with wax lubricant, a bracket support means having spaced apart portions between which the core means for the pedal is included and one of which has a blind aperture and the other of which has a free, pin-receiving aperture, a pin therein concentric to said swing axis and insertable through the free aperture, the core means, and the blind aperture to a final position whereby each end of the pin extends beyond the corresponding spaced apart portions of the bracket means, said bracket means and said pin having disengageably engageable means establishing cooperation therebetween at the free portion of the former to hold the latter fixed against relative movement in a direction about said axis, said pin and said core means having disengageably engageable means at the opposite end establishing cooperation to render the former yieldably fixed to the latter against relative movement in an axial direction.

4. An accelerator pedal for use with mechanism incorporating a spaced apart accelerator rod and bracket supported pin, said pin being arranged to define a swing axis from which said pedal is adapted to swing in a substantially vertical plane of movement and said accelerator rod having an enlarged end which is adapted to move longitudinally along a path disposed within said vertical plane, said pedal comprising a metal pedal plate bent back on itself adjacent the heel portion thereof to form a closed loop of which the plane of the central axis thereof is arranged at a slight acute angle to a reference line disposed in the plane of the plate so as to be mutually perpendiclular with respect to the longitudinal axis of the latter, a rubber covering over at least a portion of the surfaces of the pedal plate and bonded thereto, said covering incorporating a pair of generally cylindrical parts one adjacent the toe portion of the pedal plate and including socket forming elastic core means adapted to receive the enlarged head of the accelerator rod so as to allow the same freedom of movement in two directions, the other cylindrical part being bonded within the closed loop at the heel portion of the pedal plate and including pin receiving elastic core means for receiving said bracket supported pin which is concentric to said swing axis, at least one of said core means being wax impregnated for self-lubrication of the same and at least said pin receiving core means having an inwardly directed bead of deflectable rubber affixed to the interior surface thereof for disengageably engaging complementarily recessed means on said pin for retaining the latter against unwanted relative movement of displacement in an axial direction.

5. In combination, a support bracket having at least one opening therein defining a fixed swing axis, a part supported to swing about the axis on the bracket and having hollow core means mounted thereto for registry with the bracket opening, said core means having a preformed elastically deflectable protrusion, and a hinge pin passed through the support bracket opening and the core means when mutually in registry and having a nose adapted to slidingly wedge the protrusion out of the path thereof and having a reduced portion into which the protrusion snaps in final position.

6. In combination, a support bracket having at least one opening therein, a part to be swingably supported by means of an insertable hinge pin on the bracket and having hollow core means affixed thereto in a position of registry with the bracket opening, said core means having a preformed elastically deflectable protrusion in the path of the hinge pin, and a hinge pin which is provided to be inserted through the support bracket opening and the core means when mutually in registry and having an end engageable with the protrusion to displace the same and temporarily clear it out of the path thereof and having a reduced portion adjacent said pin end into which the protrusion snaps after clearing the latter.

7. In combination, a support bracket having at least one opening therein which is noncircular in cross section and which defines a fixed swing axis, a part to be swingably supported on the bracket about the axis as a center and having hollow core means in registry with the bracket opening, said core means having a preformed elastically deflectable protrusion therein, and a hinge pin passed through the support bracket opening and the core means when in registry, and having a nose adapted to slidingly wedge the protrusion out of the path thereof and having a reduced portion into which the protrusion snaps in final position, said pin having an enlarged head portion of general noncircular section complementary to the support bracket opening and engageable therewith in final position of the pin to prevent relative rotation between the pin and the support bracket.

8. In combination, a supporting part including a pair of spaced apart bracket means having transversely aligned openings at least one of which is polygonal in cross section, a supported pedal part having a hollow elastic core means for defining a swing axis therefor concentric to said openings and adapted to be received by said bracket means in registry with the aligned openings thereof, said elastic core means incorporating internally thereof a preformed stretchable annular lip portion, and a pin having an end axially insertable in the concentric bracket and core means and formed with a tapered nose initially engageable with the annular lip portion to stretch the same so as to pass through beyond the lip portion, and formed with a portion of reduced cross section behind the nose into which the lip elastically returns itself to its initial preformed shape, said pin having a portion of polygonal cross section complementarily received in said polygonal bracket portion and coming into engagement therewith substantially simultaneously with the elastic return of the lip.

9. In combination, a support part comprising a pair of spaced apart bracket means having transversely aligned openings at least one of which is a blind opening, a supported pedal part having hollow elastic core means for defining a swing axis therefor concentric to said openings and adapted to be received by the said bracket means in registry with the aligned openings, said elastic core means incorporating a preformed but circumferentially stretchable circular lip portion internally thereof at the end adjacent the blind opening, and a pin having an end to be passed axially through the concentric bracket and core means and formed with a tapered nose initially engageable with the circular lip portion to stretch and expand the same out of the way in passing, and formed with a portion of reduced cross section adjacent the nose into which the lip elastically returns itself when it contracts to its initial preformed shape.

References Cited in the file of this patent
UNITED STATES PATENTS

| | | |
|---|---|---|
| 1,793,874 | Skillman | Feb. 24, 1931 |
| 1,835,575 | Sanders et al. | Dec. 8, 1931 |
| 2,068,474 | Schwinn | Jan. 19, 1937 |
| 2,122,839 | Guy | July 5, 1938 |
| 2,127,200 | Boersma | Aug. 16, 1938 |
| 2,167,868 | Best | Aug. 1, 1939 |
| 2,358,518 | Kraft | Sept. 19, 1944 |
| 2,507,009 | Haushalter | May 9, 1950 |
| 2,678,853 | Reeder | May 18, 1954 |